US006623539B2

(12) United States Patent
Lee et al.

(10) Patent No.: US 6,623,539 B2
(45) Date of Patent: Sep. 23, 2003

(54) CYCLONE DUST COLLECTING APPARATUS FOR A VACUUM CLEANER

(75) Inventors: Byung-jo Lee, Gwangju (KR); Min-jo Choi, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 0 days.

(21) Appl. No.: 10/075,024

(22) Filed: Feb. 12, 2002

(65) Prior Publication Data

US 2003/0046910 A1 Mar. 13, 2003

(30) Foreign Application Priority Data

Sep. 13, 2001 (KR) ........................................ 2001-56355

(51) Int. Cl.$^{7}$ ................................................ B01D 45/12

(52) U.S. Cl. ......................................... 55/426; 55/459.1

(58) Field of Search ............................. 55/459.1, 459.2, 55/424, 426, DIG. 3

(56) References Cited

U.S. PATENT DOCUMENTS 3,200,568 A * 8/1965 McNeil ........................ 96/195
3,288,300 A * 11/1966 Bouchillon .............. 210/512.1
3,934,990 A 1/1976 Ide, III

FOREIGN PATENT DOCUMENTS

| | | |
|---|---|---|
| CH | 663163 | 11/1987 |
| DE | 2738850 | 3/1979 |
| EP | 0815788 | 1/1998 |
| EP | 0965375 | 12/1999 |
| GB | 2000991 | 1/1979 |
| GB | 2189413 | 10/1987 |
| GB | 2342602 | 5/2000 |
| WO | 9835602 | 8/1998 |

* cited by examiner

*Primary Examiner*—Robert A. Hopkins
(74) *Attorney, Agent, or Firm*—Ladas & Parry

(57) ABSTRACT

A cyclone dust collecting apparatus has: a cyclone body; a suction pipe extended to be protruded into the cyclone body by penetrating one side of the cyclone body in order to guide an air, which has been drawn into through a suction unit, into the cyclone body; a discharge pipe for guiding a clean air centrifugally separated in the cyclone body to an outside of the cyclone body; and a guide member for guiding the air, which whirls along a side wall of the cyclone body after being drawn into through the suction pipe, to a lower side of the suction pipe. According to the cyclone dust collecting apparatus of the present invention, a deterioration of suction force of the cyclone dust collecting apparatus is prevented, and thus a dust collection efficiency of the cyclone dust collecting apparatus will be improved.

6 Claims, 6 Drawing Sheets

CYCLONE DUST COLLECTING APPARATUS FOR A VACUUM CLEANER

BACKGROUND OF THE INVENTION

1. Field of the Invention

The present invention relates generally to a vacuum cleaner, and more particularly to a cyclone dust collecting apparatus for a vacuum cleaner that centrifugally separates dust entrained in air drawn into through a suction unit.

2. Description of the Related Art

FIG. 1 shows an upright-type vacuum cleaner, such as a vacuum cleaner 10, adopting a cyclone dust collecting apparatus 40. The conventional vacuum cleaner 10 includes a suction unit 30, a cleaner body 20 having a fan motor (not shown) for generating suction power to the suction unit 30, and passages 25 and 26 (shown in phantom) for connecting the suction unit 30 and the fan motor. In addition, the cyclone dust collecting apparatus for collecting separated dust after the drawn air is centrifugally separated, and for discharging the clean air, is disposed between the passages 25 and 26 to improve a dust collecting efficiency.

The conventional cyclone dust collecting apparatus 40 includes a cyclone body 41, a suction pipe 48, a discharge pipe 47, and a dust collector 45. The air drawn into the cyclone body 41 through the suction pipe 48 of the cyclone dust collecting apparatus 40 is centrifugally separated by whirling along an inner circumference of the cyclone body 41. The separated dust from whirling air is collected in the dust collector 45 disposed at a lower part of the cyclone body 41, and the clean air is discharged through the discharge pipe 47 to outside of the cyclone dust collecting apparatus 40.

Here, as the centrifugal force generated when the air whirls, is greater, the whirling air drawn into the cyclone body 41 has a better dust separation efficiency. It is preferable that the air is guided in a direction tangential to a cylinder-type side wall for providing greater centrifugal force of the drawn air.

Accordingly, in the conventional cyclone body 41, as shown in FIG. 2, an air inlet 48*a* connected with the suction pipe 48 is disposed at one side of a side wall of the cyclone body 41, and the air inlet 48*a* is formed as an oval type along the side wall to guide the drawn air in the direction of tangential the side wall of the cyclone body 41.

However, the conventional cyclone dust collecting apparatus 40 having the above construction encounters certain problems, described below.

As shown by the arrows in FIG. 2, the air drawn into the cyclone body 41 through the air inlet 48*a* whirls along the inner circumferential surface of the side wall. The whirling air flows to the air inlet 48*a* again after whirling one time along the inner circumference of the side wall.

In this case, air newly drawn into the cyclone body 41 through the air inlet 48*a* meets the air already flown past the air inlet 48*a* after being drawn into the cyclone body 41 and whirling in the cyclone body 41. Accordingly, the current velocity of air newly drawn into the inside of the cyclone body 41 decreases. Not only the suction efficiency of the cyclone dust collecting apparatus 40 decreases, but also the centrifugal force of the drawn air, which whirls along the inner circumference of the cyclone body 41, decreases. Therefore, a problem of a decrease in the dust collecting efficiency results, for example, the dust may flow back into the discharge pipe 47 together with the clean air.

SUMMARY OF THE INVENTION

An object of the present invention is to provide a cyclone dust collecting apparatus for a vacuum cleaner having a structure so as to improve the dust collection efficiency by preventing the current velocity of air drawn into the cyclone body from being diminished.

The above object is accomplished by providing a cyclone dust collecting apparatus including: a cyclone body; a suction pipe connected with one side of the cyclone body in order to guide air, which has been drawn into the cyclone body through a suction unit,; and a discharge pipe for discharging clean having been centrifugally separated from entrained dust in the cyclone body to outside of the cyclone body. In addition, the suction pipe extends into the cyclone body so as to protrude into the cyclone body.

It is preferable that the cyclone body has: a suction pipe connected thereto; an upper wall connected to cover an upper end of the side wall; and a guide member for guiding the air, which whirls along an inner circumference of the cyclone body after being drawn into through the suction pipe, to underneath the suction pipe.

In addition, it is preferable that the guide member has a sloping side for connecting the lower side of the suction pipe with the upper wall placed at an upper part of the suction pipe, and the sloping side slopes downwardly in the direction of flow of the drawn air.

On the other hand, the upper wall is removably attached at the upper part of the side wall, and the guide member may protrude from a lower side of the upper wall.

According to the cyclone dust collecting apparatus having the above construction, the deterioration of the air suction force of the cyclone dust collecting apparatus is inhibited or prevented, thus the dust collecting efficiency will be improved.

BRIEF DESCRIPTION OF THE DRAWINGS

The objects and the features of the present invention will be more apparent by describing the preferred embodiments of the present invention with reference to the appended drawings, in which.

DETAILED DESCRIPTION OF THE PREFERRED EMBODIMENTS

Hereinbelow, the preferred embodiments of the present invention will be described in great detail by referring to the appended drawing figures.

Figure 3:
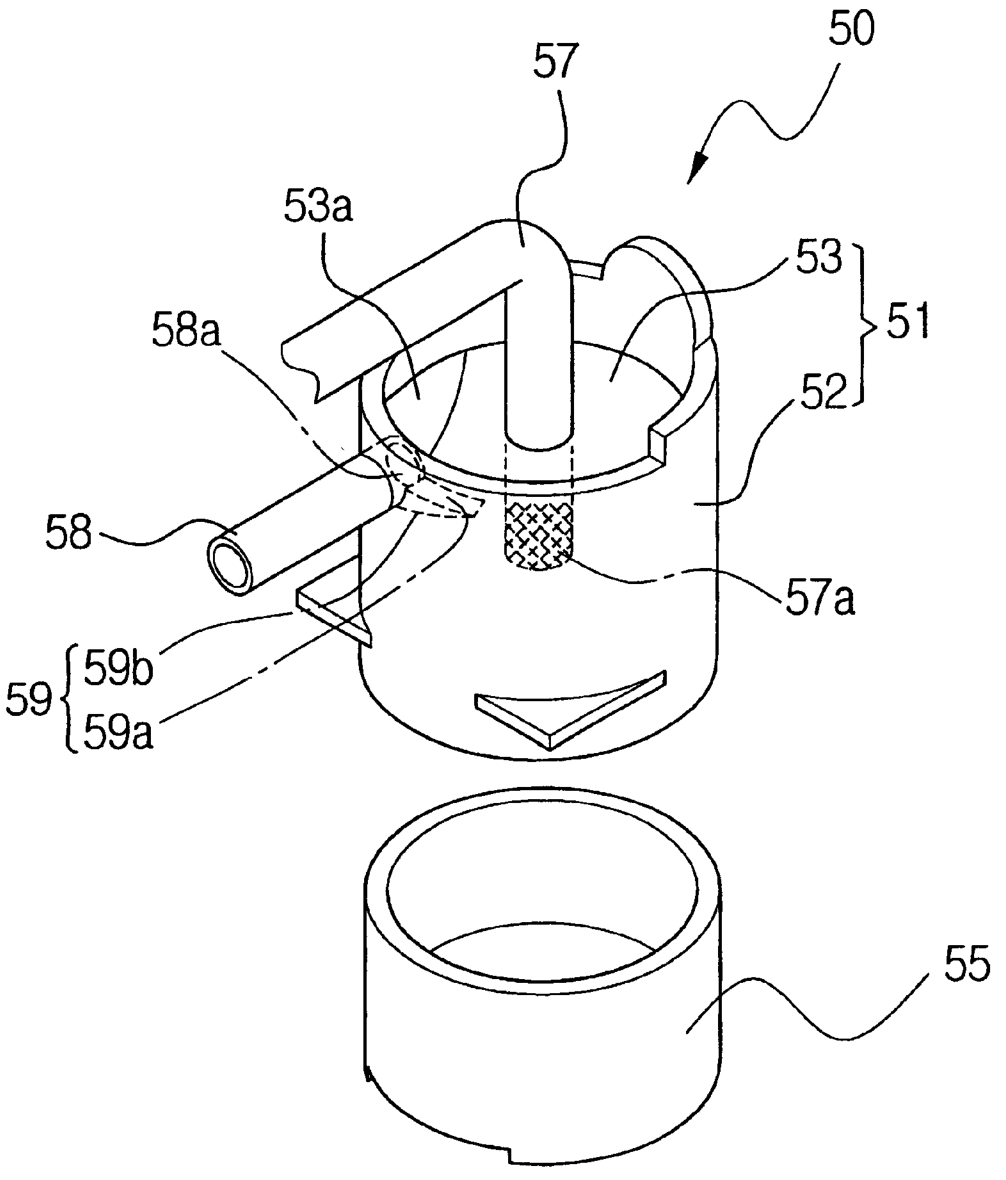
FIG. 3 is an exploded perspective detail view showing a cyclone dust collecting apparatus of a vacuum cleaner according to a first preferred embodiment of the present invention.
Figure 4:
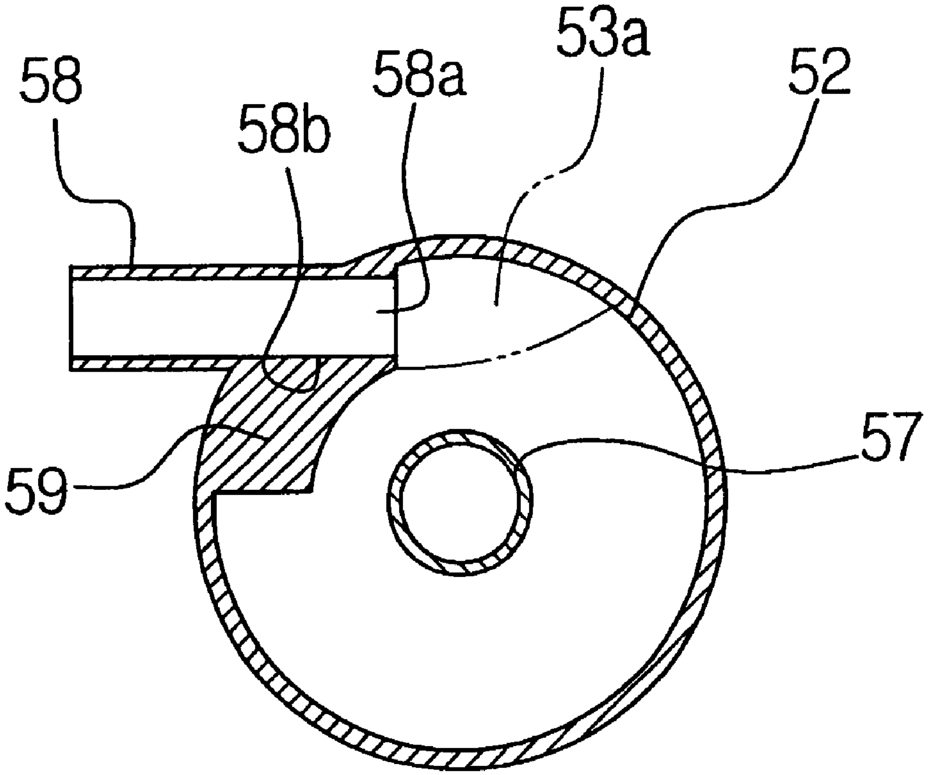
FIG. 4 is a cross-sectional plan view showing the cyclone dust collecting apparatus of FIG. 3.

Referring now to FIGS. 3 and 4, a cyclone dust collecting apparatus 50 according to a first preferred embodiment of the present invention includes a cyclone body 51, a suction pipe 58, and a discharge pipe 57.

The cyclone dust collecting apparatus 50 separates dust entrained in the air drawn from the suction unit 30 (FIG. 1) by using a centrifugal force, and the centrifugally separated dust is collected in a dust collector 55 disposed at a lower part of the cyclone body 51.

Figure 1:
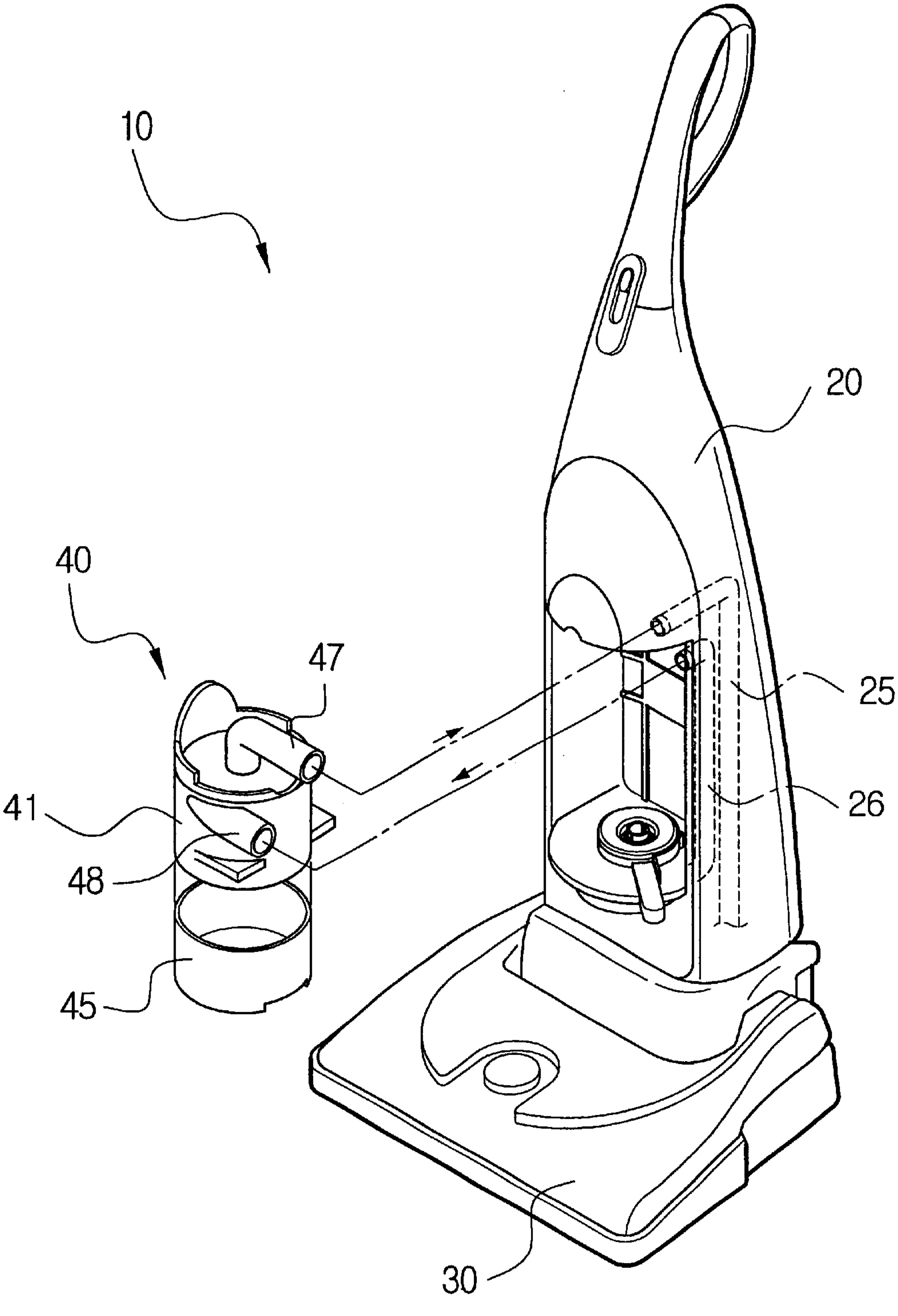
FIG.1 PRIOR ART
FIG. 1 is an exploded perspective view showing a conventional vacuum cleaner having a cyclone dust collecting apparatus.

The cyclone body 51 includes a side wall 52 formed as a cylinder to allow the drawn air to easily whirl along an inner circumferential surface, and a cover or upper wall 53 that may be integrally formed by being connected for covering an aperture at an upper end of the side wall 52. Alternatively, the upper wall 53 can be removably installed at the upper end of the side wall 52, and the dust collector 55 also can be removably installed at the lower part of the side wall 52. As the upper wall 53 and the dust collector 55 are removably installed on the side wall 52, a user can easily remove the dust collected in the cyclone dust collecting apparatus 50 after using the inventive vacuum cleaner, a modified version of the vacuum cleaner 10 (FIG. 1).

The discharge pipe 57 guides the clean air, after the dust is separated by the centrifugal force inside of the cyclone body 51, to outside of the cyclone body 51. The air is discharged to outside of the vacuum cleaner 10 after being drawn into a fan motor (not shown) of the cleaner body 20 (FIG. 1). The discharge pipe 57 is arranged to penetrate through the upper wall 53.

On the other hand, when the discharge pipe 57 is integrally formed with the upper wall 53, which is removably attached to the upper end of the side wall 52, the discharge pipe 57 can be removed from the side wall 52. Filtering means, such as a grill 57*a*, may be disposed at one end of the discharge pipe 57 at a point inside of the cyclone body 51, and thus the dust collection efficiency of the cyclone dust collecting apparatus 50 can be upgraded.

The suction pipe 58 is connected with the suction unit 30, and connected with the side wall 52 of the cyclone body 51. The suction pipe 58 has an air inlet 58*a* for guiding the air drawn by the suction unit 30 and directed into the cyclone body 51, and the air inlet 58*a* is disposed at a front end of the cyclone body 51. It is preferable that the air inlet 58*a* is disposed at an upper end inside of the cyclone body 51 so that there can be an enough space in the cyclone body 51 to allow the air drawn thereto from the suction unit 30 through the suction pipe 58 to flow downwardly by a whirling action.

In the meantime, unlike the conventional cyclone dust collecting apparatus shown in FIG. 1, the air inlet 58*a* of the present invention is not disposed on the side wall 52 of the cyclone body 51, but is disposed at the front end of the suction pipe 58 and extends inside of the cyclone body 51 for a predetermined length. Accordingly, some part of the suction pipe 58 placed inside of the cyclone body 51 has a function of cover portion 58*b* (FIG. 4), which covers the air inlet 58*a*. The cover portion 58*b* can prevent the air that flows from the air inlet 58*a*, whirls along the inner circumference of the side wall 52, and flows to the air inlet 58*a* from intervening into the flow of the air newly drawn into the cyclone body 51 through the air inlet 58*a*.

The suction pipe 58 can be extended into the inside of the cyclone body 51 for various lengths, as desired. When the length of the suction pipe 58 is longer than the preferred embodiment of the present invention, the suction pipe 58 should be bent so as to extend in a direction parallel with the inner circumference of the side wall 52. If the suction pipe 58 is extended as described above, the centrifugal force of the air drawn into the cyclone body 51 will increase.

Meanwhile, a guide member 59 for guiding the air whirling along the side wall 52 to a lower part of the cover portion 58*b* is disposed in the cyclone body 51. The guide member 59 includes an upper side 59*a* protruded for a predetermined length from the side wall 52 in the axial direction, along the direction which in the discharge pipe 57 extends, to cover some area of the upper end of the side wall 52 adjacent to the side wall of the cover portion 58*b*, and a sloping side 59*b* extended being sloped from one end of the upper side 59*a* placed at a far-off side from the side wall of the cover portion 58*b* to the lower part of the cover portion 58*b*.

Moreover, the air inlet 58*a* of the suction pipe 58 of the preferred embodiment is disposed to expose some area of the upper end of the air inlet 58*a* to the upper part of the upper wall 53. Accordingly, some of the air drawn into the cyclone body 53 through the suction pipe 58 flows along the upper part of the upper wall 53, which defines an outside surface of the cyclone body 51. The cyclone body 51 further includes a curved portion 53*a* for guiding the air drawn toward the outside surface of the cyclone body 51 into the cyclone body 51. The curved portion 53*a* is formed by forming some part of the upper wall 53 adjacent the air inlet 58*a* so that it protrudes upwardly into the chamber defined by the cyclone body 51. Since the curved portion 53*a* is formed as a rounded sloping member, as shown, for connecting the upper end of the air inlet 58*a* with the upper wall 53, it completely covers the upper end of the air inlet 58*a*, the air inlet 58*a* is completely shielded by the curved portion 53*a* from the action of the air whirling inside the chamber of the cyclone body 51. Therefore, the drawn air is drawn into the cyclone body 51 through the suction pipe 58 and is thereafter guided to the lower part of the side wall 52 by the sloping surface of the curved portion 53*a*.

Alternatively, when molding the side wall 52 of the cyclone body 51, the curved portion 53*a* and the suction pipe 58 may be molded to be integrally disposed with the side wall 52. In addition, as a method for guiding the air drawn into the cyclone body 51 downwardly, the suction pipe 58 is disposed to penetrate the side wall 52 at a predetermined angle to allow the air inlet 58*a* to direct the air toward the lower part of the side wall 52.

In the meantime, it is preferable that the cyclone body 51 of the present invention is made of a transparent synthetic resin so that the user can easily observe and monitor the amount of piling dust. If the guide member 59 is integrally molded with the side wall 52, a space between the sloping side 59*b* and the upper side 59*a* can include the synthetic resin, so as to provide for an easier molding process. Otherwise, the guide member 59 can be formed having various forms, for example, the sloping side 59*b* can be formed being bent for an effective flow of the air.

Hereinbelow, the operation of the cyclone dust collecting apparatus 50 of the vacuum cleaner according to the present invention will be described by referring to FIG. 5.

First, when the fan motor (not shown) of the cleaner body 20 (FIG. 1) is driven, a suction force is generated in the suction unit 30. Then, the dust on the cleaning surface is drawn with the air through the suction unit 30 by the generated suction force.

Figure 5:
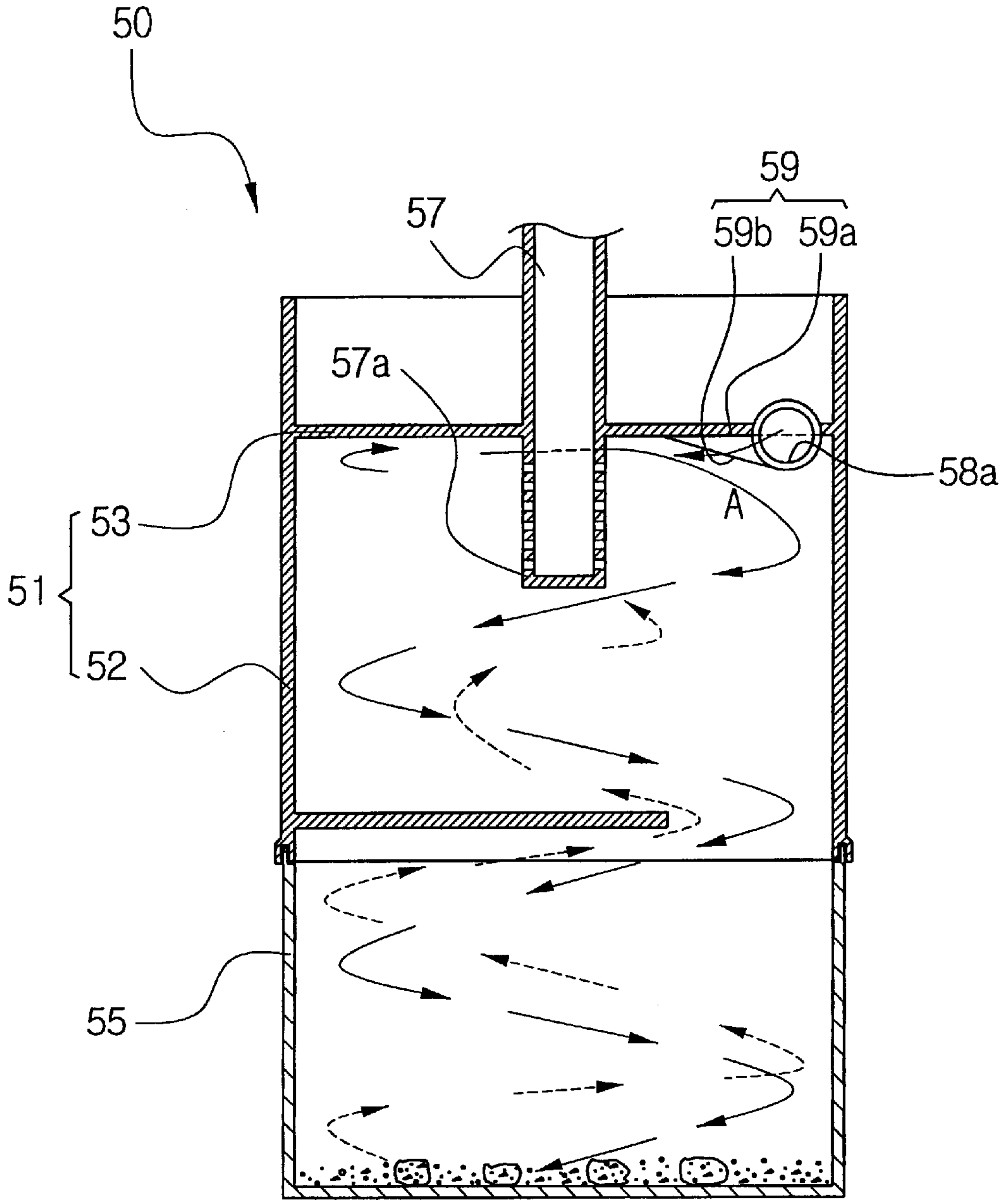
FIG. 5 is a cross-sectional side view showing the cyclone dust collecting apparatus of the vacuum cleaner according to the first preferred embodiment of the present invention in an operational status.

Referring now to FIG. 5, the drawn air flows into the cyclone body 51 disposed at a lower stream of the suction unit 30 through the suction pipe 58. At this time, as the air inlet 58*a* of the suction pipe 58 is formed to be adjacent to the inner circumference of the side wall 52 of the cyclone body 51, the air is drawn in a direction tangential to the side wall 52, that is, parallel to the inner circumference of the side wall 52. Moreover, the drawn air is directed downwardly through the upper part of the air inlet 58*a* into the cyclone body 51 by the curved portion 53*a* (FIGS. 3 and 4) of the upper wall 53.

The air drawn into the cyclone body 51 flows downwardly, whirling along the side wall 52, and the current velocity of the air decreases as the flowing air reaches the dust collector 55 connected to the lower part of the cyclone body 51. Accordingly, the dust contained in the drawn air is separated from the air by its own weight and is collected at the bottom of the dust collector 55.

After that, the clean air flows upwardly from the bottom and is discharged to the outside of the cyclone body 51 through the discharge pipe 57.

On the other hand, when the air drawn from the air inlet 58*a* and now whirling within the chamber defined by wall 52, reaches the guide member 59, the air is guided underneath the suction pipe 58 by the sloping side 59*b* of the guide member 59, as indicated by arrow 'A' in FIG. 5. Thus, the decrease in the current velocity of the drawn air will be minimized. As the current velocity of the drawn air is not decreased, the deterioration of the suction force of the cyclone dust collecting apparatus 50 will be prevented. Moreover, the centrifugal force of the air, which whirls inside of the cyclone body 51, can be maintained also, thus the dust collection function of the cyclone dust collecting apparatus 50 will be improved.

The improvement in the function of the cyclone dust collecting apparatus 50 according to the present invention will be more apparent by referring to Table 1. Table 1 shows the result of the measurement of a suction efficiency and the consumption of electric current after driving the conventional cyclone dust collecting apparatus 40 shown in FIG. 1, and the cyclone dust collecting apparatus 50 according to the present invention under the same conditions. From Table 1, it can be seen that the suction efficiency of the cyclone dust collecting apparatus 50 according to the present invention has been improved by about 26% compared to the conventional dust collecting apparatus 40.

TABLE 1

Figure 2:
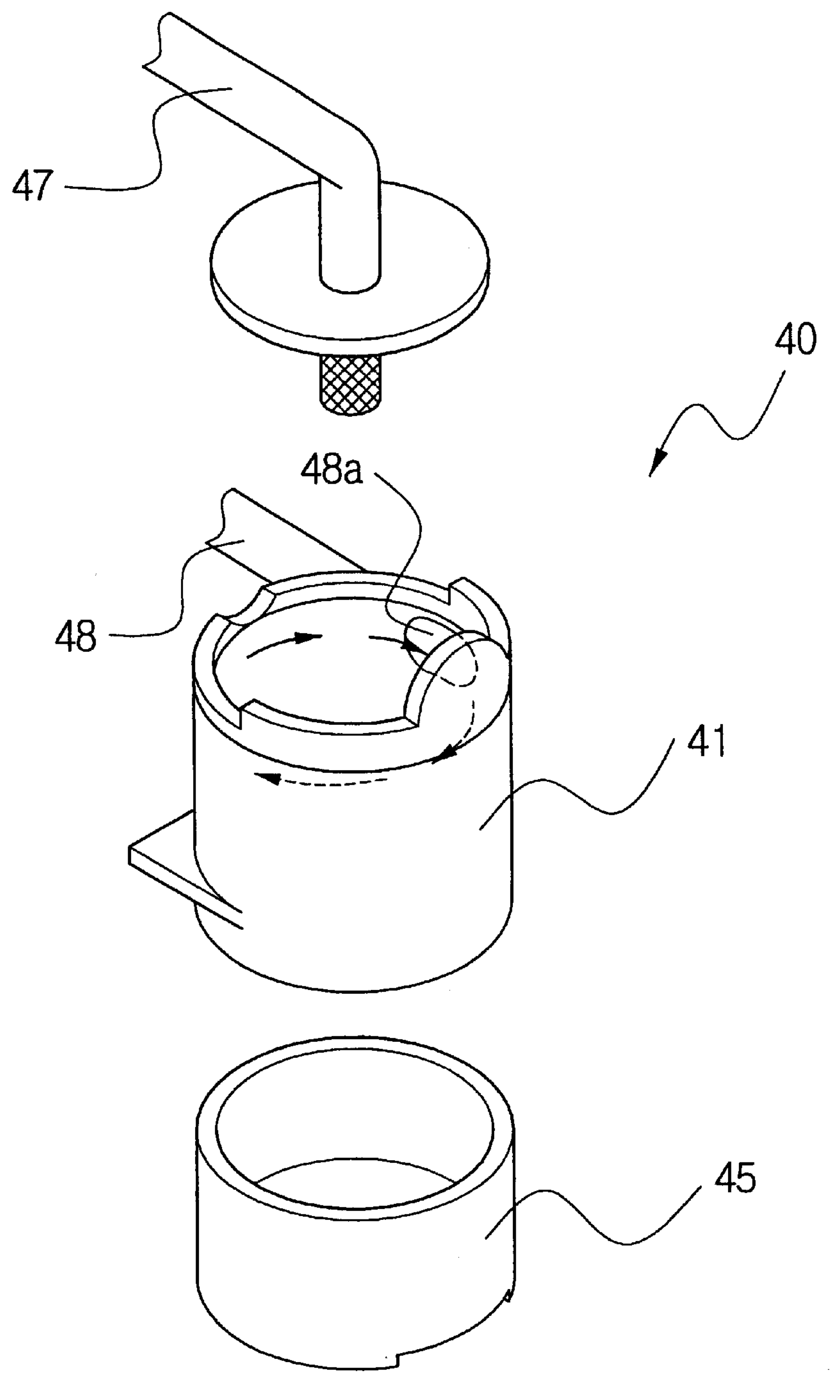
FIG.2 PRIOR ART
FIG. 2 is an exploded perspective detail view showing the cyclone dust collecting apparatus of FIG. 1.

| Time of | Conventional art (FIGS. 1 and 2) | | Present invention (FIGS. 3–5) | |
|---|---|---|---|---|
| experiment | Suction efficiency | Consumption of current | Suction efficiency | Consumption of current |
| 1 | 76.8 | 9.81 | 86.7 | 10.07 |
| 2 | 92.3 | 10.03 | 110 | 9.93 |
| 3 | 81.3 | 9.84 | 97.7 | 10.18 |
| 4 | 69.1 | 9.96 | 90.3 | 10.17 |
| 5 | 56.8 | 9.65 | 95.2 | 10.13 |
| Average | 75.26 | 9.804 | 95.98 | 10.096 |

Figure 6:
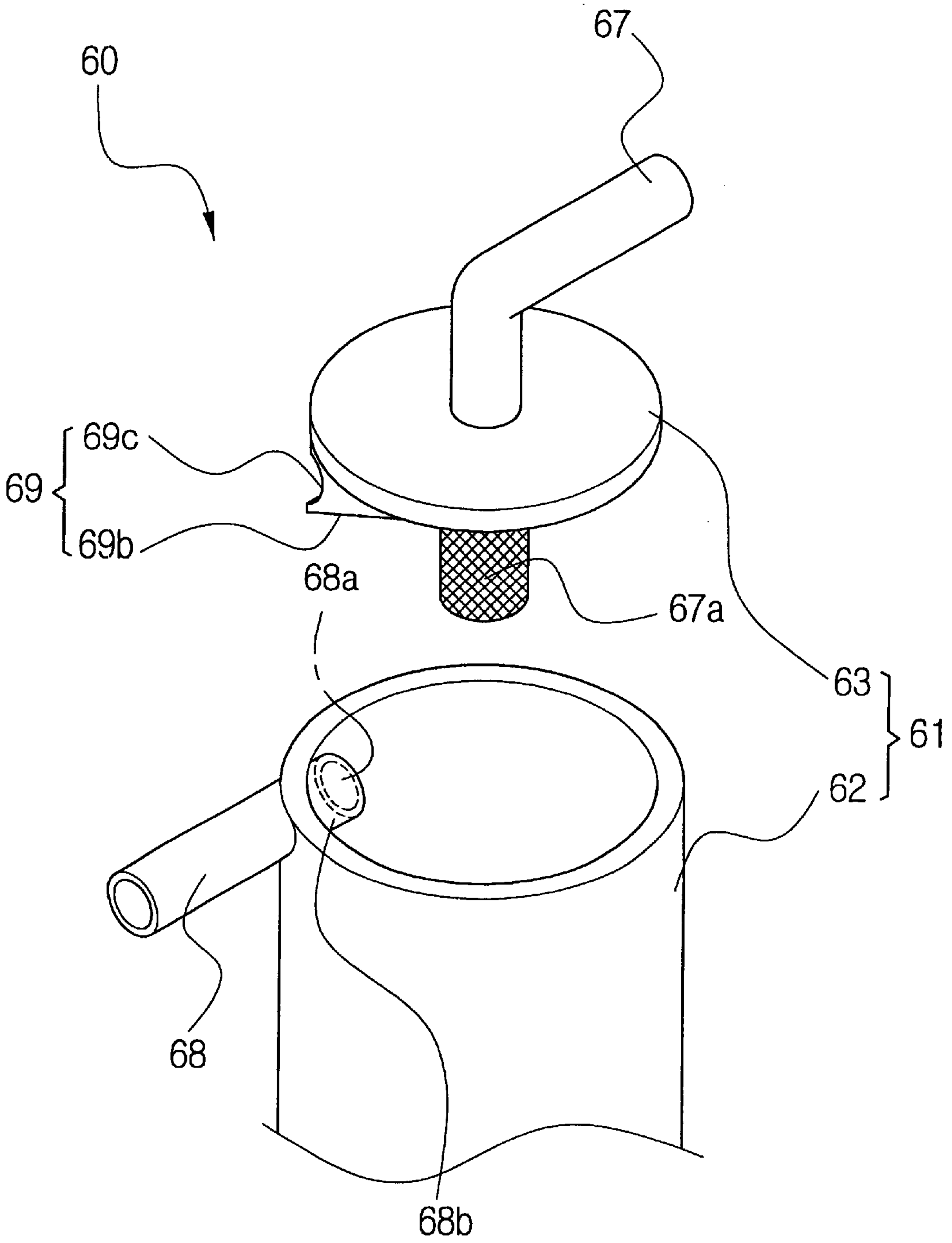
FIG. 6 is an exploded perspective detail view showing the cyclone dust collecting apparatus of the vacuum cleaner according to a second preferred embodiment of the present invention.

On the other hand, in a cyclone dust collecting apparatus 60 according to a second preferred embodiment of the present invention, shown in FIG. 6, the guide member 69 protrudes from the upper wall 63 of the cyclone body 61. Here, the upper wall 63 is removably attached at an upper opening of the side wall 62.

In the meantime, the guide member 69 has a groove 69*c*, corresponding to an external appearance of the cover portion 68*b*, and the groove 69*c* is formed at one side facing the cover portion 68*b* when connecting the upper wall 63 with the side wall 62. Accordingly, if the upper wall 63 and the side wall 62 are attached to each other, the groove 69*c* can cover the outside of the cover portion 68*b* of the suction pipe 68 that extends in the direction of the inner circumference of the side wall 62.

In addition, when connecting the upper wall 63 with the side wall 62, the guide member 69 further includes the sloping side 69*b* extending from the upper wall 63 to the lower part of the suction pipe 68. The function and the structure of the sloping side 69*b* are omitted here, since they are the same as the first preferred embodiment described before.

Meanwhile, either of the cyclone dust collecting apparatus 50, 60 may be applied to an upright-type vacuum cleaner as has been described in the case of the preferred embodiments of the present invention. Additionally, the cyclone dust collecting apparatus 50, 60 can be applied to a canister-type vacuum cleaner.

According to the cyclone dust collecting apparatus 50, 60 of the vacuum cleaner of the preferred embodiments having the above construction, as the air suction structure including the suction pipe 58, 68 is improved, the air newly drawn into the cyclone body 51, 61 can be prevented from intervening with the flow of previously drawn air. Accordingly, it prevents the deterioration of the suction force of the cyclone dust collecting apparatus 50, 60, and brings the effect of improving the dust collection function.

Moreover, as the guide member 59, 69 for guiding the air, which has been drawn into the cyclone body 51, 61 through the suction pipe 58, 68 and whirls therein, guides the air flow to the lower part of the suction pipe 58, 68, the decrease in the current velocity of the whirling air caused by the conflict with the suction pipe 58, 68 is minimized, and the efficiency of separating the dust of the cyclone dust collecting apparatus 50, 60 will be improved.

The preferred embodiments of the present invention have been illustrated and described herein. However, the present invention is not limited to the preferred embodiments described here, and someone skilled in the art can modify the present invention without distorting the point of the present invention as claimed in, and limited only by, the following claims.

What is claimed is:

1. A cyclone dust collecting apparatus comprising:

a suction pipe;

a cyclone body comprising:

a cylindrical side wall connected with the suction pipe in order to guide air, which has been drawn into the cyclone body through a suction unit;

an upper wall connected for covering an upper end of the side wall; and wherein the guide member further comprises an upper side and a sloping side, the upper side protruding inwardly inside the cylindrical sidewall along a predetermined arc portion and having a gradually rising slope to cover an upper area of the suction pipe connected to the cylindrical sidewall, and the sloping side also protruding inwardly inside the cylindrical sidewall along the predetermined arc portion and having a gradually falling slope to cover an bottom area of the suction pipe connected to the cylindrical sidewall; and a discharge pipe for discharging clean air having been centrifugally separated from entrained dust in the cyclone body, to outside of the cyclone body, wherein the suction pipe extends into the cyclone body so as to protrude into the cyclone body, and the drawn air is guided in a direction tangential to the cyclone body by a front end protruding into the cyclone body.

2. The cyclone dust collecting apparatus of claim 1, wherein the sloping side of the guide member is sloped downwardly in the direction of flow of the drawn air.

3. The cyclone dust collecting apparatus of claim 1, wherein the upper wall is removably attached to the upper part of the side wall, and the guide member protrudes from a lower side of the upper wall.

4. A cyclone dust collecting apparatus, comprising:

a cylindrical-type cyclone body having an upper opening;

an upper wall removably connected with an upper end of the cyclone body, the upper wall for opening and closing the upper opening of the cyclone body;

a suction pipe connected with one side of the cyclone body in order to guide air, which has been drawn into the cyclone body through a suction unit, into the cyclone body; and a discharge pipe for discharging clean air to outside of the cyclone body after dust has been centrifugally separated in the cyclone body, wherein the suction pipe extends into the cyclone body and protrudes into the cyclone body, and the drawn air is guided in a direction tangential to the cyclone body by a front end protruded into the cyclone body; and a guide member protruding from the lower side of the upper wall in order to guide the air, which whirls along the inner circumference of the cyclone body after being drawn into the suction pipe, to a side underneath the suction pipe, wherein the guide member further comprises a sloping side for connecting the lower side of the suction pipe with the upper wall of the cyclone body placed at an upper part of the suction pipe.

5. The cyclone dust collecting apparatus of claim 4, wherein the sloping side of the guide member slopes downwardly in the direction of flow of the drawn air.

6. The cyclone dust collecting apparatus of claim 5, wherein the guide member further comprises a groove, corresponding to a typo of the suction pipe, formed at one side and connected to the suction pipe when connecting the upper wall to the cyclone body, and one side of the suction pipe is inserted into the groove to connect the upper wall to the cyclone body.

* * * * *